July 3, 1951 L. A. KEMPTON 2,558,962
FLUID VALVE STRUCTURE
Filed Jan. 2, 1947 3 Sheets—Sheet 1
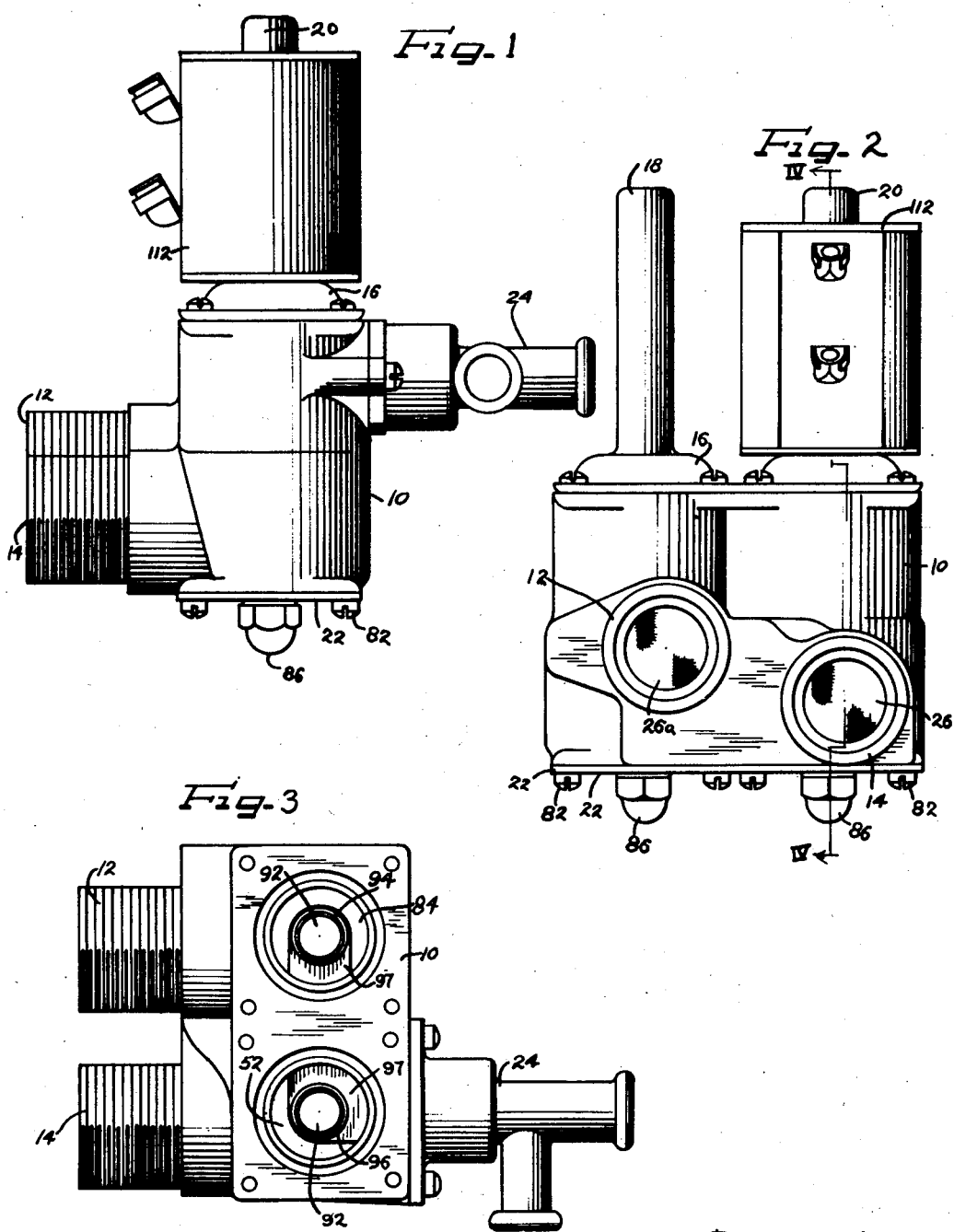
Inventor
LESLIE A. KEMPTON
by *The Firm of* [signature] Attys July 3, 1951 L. A. KEMPTON 2,558,962
FLUID VALVE STRUCTURE
Filed Jan. 2, 1947 3 Sheets—Sheet 2
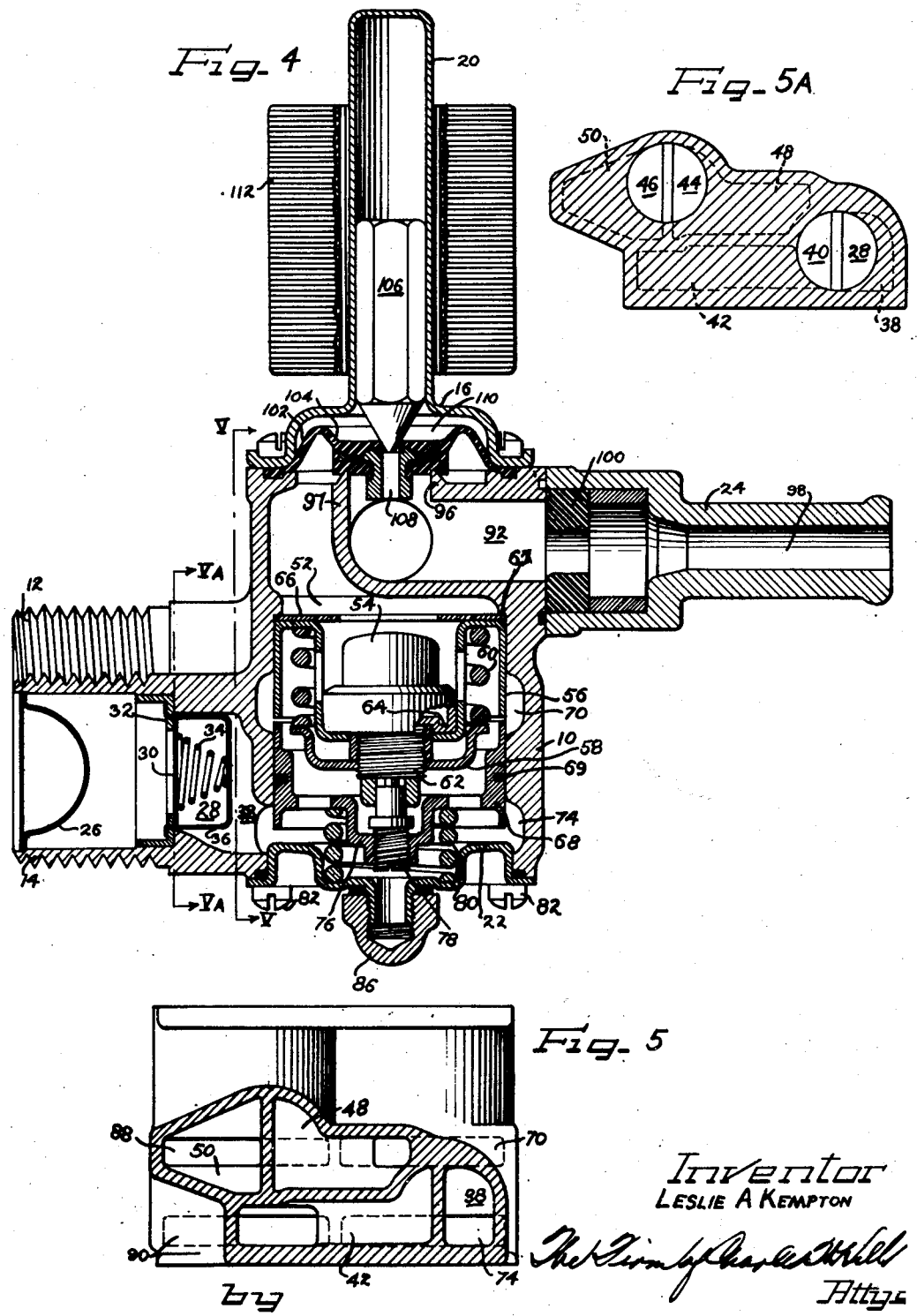
Inventor
LESLIE A KEMPTON July 3, 1951 L. A. KEMPTON 2,558,962
FLUID VALVE STRUCTURE
Filed Jan. 2, 1947 3 Sheets-Sheet 3
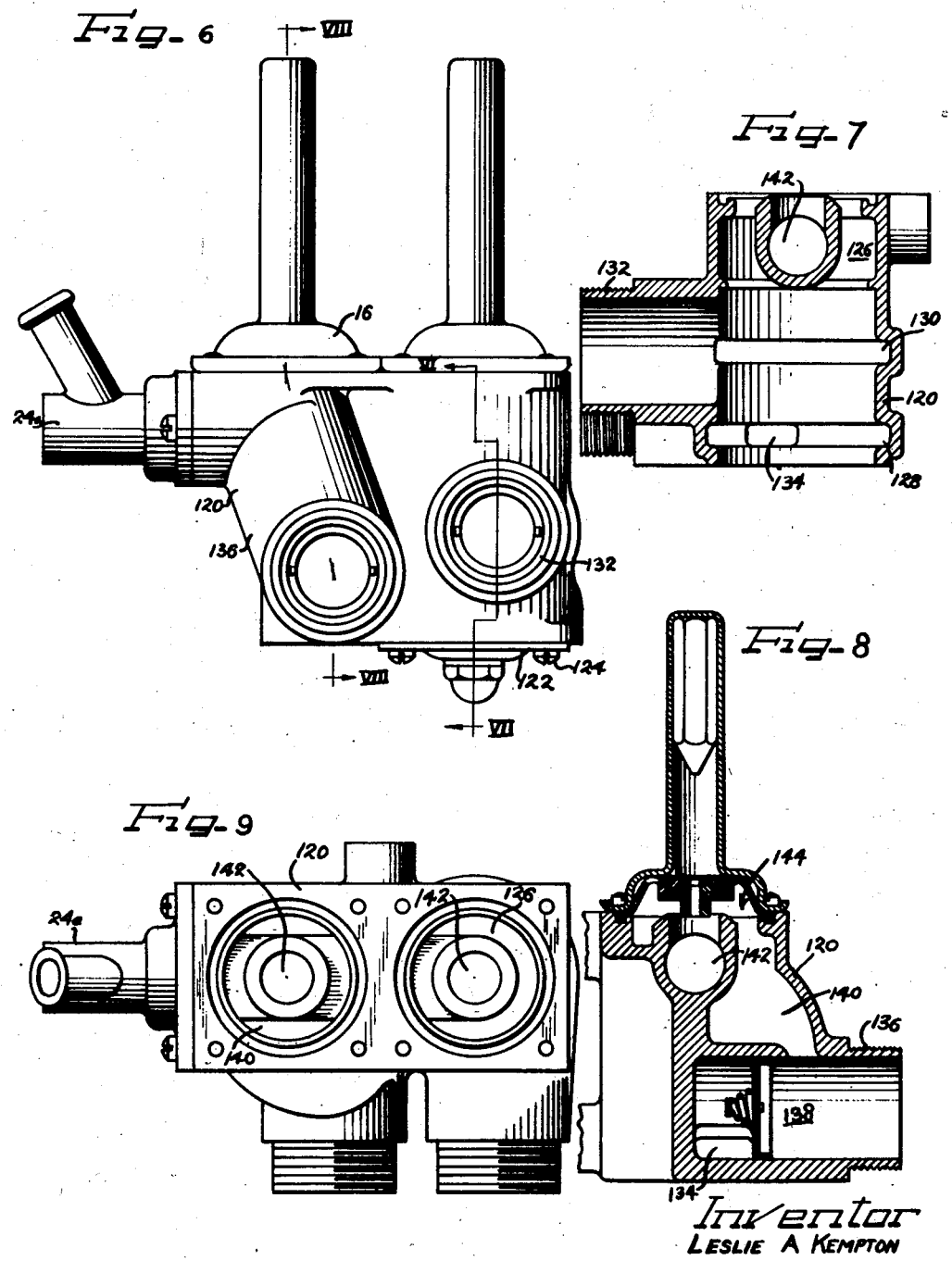
Inventor
LESLIE A KEMPTON Patented July 3, 1951

2,558,962

UNITED STATES PATENT OFFICE 2,558,962

FLUID VALVE STRUCTURE

Leslie A. Kempton, St. Petersburg, Fla., assignor to The Dole Valve Company, Chicago, Ill., a corporation of Illinois Application January 2, 1947, Serial No. 719,826

4 Claims. (Cl. 236—12)

My invention relates to thermostatically controlled fluid mixing valves wherein the relative amounts of fluid from two different sources are proportioned to achieve a fluid stream of predetermined temperature.

It is an object of my invention to provide an improved fluid mixing valve.

A further object of my invention is to provide an improved fluid mixing valve having two fluid mixing chambers but having only two connections for sources of fluid.

Further, it is an object of my invention to provide a fluid mixing valve wherein undesired reversed fluid flow cannot take place.

Yet another object of my invention is to provide an improved fluid mixing valve having a plurality of fluid mixing chambers and means to select fluid from these chambers without altering the total rate of fluid flow through the valve.

It is yet another object of my invention to provide an improved fluid mixing valve having a convenient and accessible arrangement for draining fluids therefrom and for adjusting the temperature of the regulated fluid.

Still another object of my invention is to provide an improved fluid mixing valve wherein the possibility of damage due to excessive temperatures is avoided.

It is still another object of my invention to provide an improved fluid mixing valve having features of construction, combination and arrangement whereby relatively simple castings are required to the end that the valve may be simply and inexpensively constructed.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings.

On the drawings:

Figure 1 is a side view of a double type mixing valve incorporating the features of my invention;

Figure 2 is a view taken from the left-hand side of the fluid mixing valve of Figure 1;

Figure 3 is a top view of the mixing valve of Figures 1 and 2 with the upper closure element removed;

Figure 4 is a cross-sectional view through axis IV—IV, Figure 2;

Figure 5 is a cross-sectional view of a portion of the valve of Figure 1 through axis V—V, Figure 4;

Figure 5a is a cross-sectional view of a portion of the valve of Figure 1 through axis Va—Va, Figure 4;

Figure 6 is a side view of a single type fluid mixing valve incorporating the features of my invention;

Figure 7 is a cross-sectional view of a portion of the valve of Figure 6 through axis VII—VII, Figure 6;

Figure 8 is a cross-sectional view of the valve of Figure 6 through axis VIII—VIII, Figure 6; and Figure 9 is a top view of the fluid mixing valve of Figure 6 with the top closure element removed.

As shown on the drawings:

In Figures 1, 2, 3 and 4, 10 represents the body portion of the fluid valve, this being of some suitable material such as, for example, cast brass. On one side of body 10 are provided two fluid inlet receptacles 12 and 14, the former being for cool fluid and the latter for hot fluid. Upper closure element 16 is attached to top of body 10 and includes extensions 18 and 20 for the fluid control plungers which operate to control fluid flow in a manner to be described in further detail hereinafter. Lower closure element 22 is attached to the bottom of body member 10 and serves to hold the operative elements of the fluid valve structure in place. Regulated fluid is taken from the fluid valve structure through outlet member 24 which is attached to one side of body 10.

The arrangement of the operative elements within the fluid valve structure of Figures 1, 2 and 3 may best be understood by reference to Figure 4 which is a cross-section view through the axis IV—IV, Figure 2. As shown in this figure, fluid inlet receptacle 14 contains strainer 26 which prevents dirt particles from entering the valve proper. A similar strainer, 26a, Figure 2, is provided in cool fluid inlet receptacle 12. In addition, each inlet receptacle houses two fluid check valves, the ones in receptacle 14 being shown generally by reference characters 28 and 40, Figures 4 and 5a. The check valve 28 comprises a plate member 30 which may be semicircular and is resiliently biased against the seat formed by washer 32 by spring 34, spring 34 acting against retainer 36. When the fluid pressure within receptacle 14 exceeds the pressure within a valve chamber 38 of the check valve 28, by a sufficient amount to overcome the bias force of spring 34, the plate 30 is pushed backwardly and permits fluid flow from receptacle 14 to chamber 38. Under all other conditions no fluid flows past valve 28.

Figures 5 and 5a show the various entrance chambers supplied with fluid from receptacles 12 and 14 and the disposition of the check valves used to control the admission of fluid thereto. From Figure 5a it will be evident that check valve 28 controls directly the admission of fluid to chamber 38. Similarly, a semi-circular check valve 40, Figure 5a, occupies the other half of the available area of inlet receptacle 14 and controls the passage of fluid to chamber 42. The check valve 40 is like the check valve 28, so need not herein be shown or described in detail. The inlet receptacle 12 likewise contains semi-circular fluid check valves 44 and 46 similar to the check valves 28 and 40 which control passage of fluid from inlet member 12 to chambers 48 and 50 respectively in communication therewith. The location and shape of chambers 38, 42, 48 and 50 will be evident from examination of Figure 5. From the arrangement of the check valves and passages just described it will be evident that fluid flow takes place to chambers 38, 42, 48 and 50 if, and only if, the fluid pressure within the corresponding receptacles 12 and 14 is sufficient to overcome the biasing of the springs of the respective check valves 28, 40, 44 and 46, together with such fluid pressure as may exist in the chambers 38, 42, 48 and 50 themselves.

The body 10 contains a fluid mixing cavity 52 for each portion of the fluid mixing valve. This cavity contains the thermostatic control elements, together with the outlet control valve for the fluid therein. In Figure 4 the thermostatic control element is shown at 54 and is of the type wherein its length varies with variations in temperature. The element 54 includes a casing supported within chamber 52 by means of supports 56 and 58 which are biased apart by spring 60. Support 58 is attached to control element 54 by means of threaded engagement with a reduced correspondingly threaded extension 62 of said element or casing. Support 56 engages element 54 only by reason of its engagement with the annularly extending portion 64 thereof. Support 56 is slidably mounted within cavity 52 during assembly of the valve and is prevented from upward movement by engagement with washer 66 which in turn engages the inwardly extending wall portion 67 of cavity 52.

The thermostatic control element 54 may be any one of various types well known in the art. Preferably, this element is of the so-called vernet type in which a powerful expanding action is produced in correspondence with any increase in temperature, this expanding action being developed between the threaded portion 62 and an extension or plunger 78.

Control of the fluid flow to chamber 52 is determined by the position of cylinder 68 along the axis of the cavity 52. This cylinder 68 at its upper edge engages the downwardly extending portion of support 56 to cut off fluid supply from annular chamber 70 to cavity 52, whereas its lower end engages closure 22 to cut off fluid supply from annular chamber 74 to cavity 52. The position of cylinder 68 is determined by control element 54 because of the threaded connection between the inwardly extending portion 76 of member 68 with the downwardly projecting threaded portion 78 of control element 54. Inasmuch as the length of control element 54 between portions 78 and 62 varies in accordance with the temperature thereof, the cylinder 68 is moved relative to body 10 and cavity 52 in accordance with the temperature of the fluid within that chamber.

Members 56 and 66, together with cylinder 68, are biased upwardly by reason of spring 80 which acts against closure 22. Thus, when this closure is attached in place the entire control assembly is fixed in position except insofar as the location of cylinder 68 is varied by element 54 in accordance with the temperature of fluid within cavity 52. Thus, the thermostatic control unit may be assembled by merely inserting the component parts in chamber 52 and attaching closure 22 in place by suitable means, such as screws 82.

The cylindrical element 68 is held in fluid tight engagement with the inner periphery of cavity 52 of body 10 by reason of a flexible packing ring 69. This prevents fluid flow between chambers 70 and 74 along the side walls of the cavity and prevents leakage of fluid from one chamber to the other when either one of said chambers is closed by the valve element 68. Thus the annular opening between the lower portion of member 68 and the closure 22 determines the area available for fluid flow from cavity 74 and the annular opening between the upper portion of member 68 and the support 56 determines the area available for fluid flow from cavity 70. The position of cylinder 68 accordingly is the sole factor determining the fluid flow to cavity 52.

The connections of annular chambers 70 and 74 to the supply of fluid will be evident from examination of Figures 3, 4, 5 and 5a. As shown in these figures, entrance receptacle 14 for hot fluid is connected to check valves 28 and 40, which control the passage of fluid into chambers 38 and 42 respectively. Chamber 38, however, is in fluid communication with annular chamber 74 so that as cylinder 68, Figure 4, moves upwardly, increased hot fluid is supplied to the fluid mixing chamber 52. Similarly, cool fluid receptacle 12 is connected through the fluid check valve 44 to the chamber 48 and, as shown in Figure 5, is in fluid communication with annular chamber 70, Figure 4. Thus, as cylinder 68 moves downwardly, increased cool fluid is supplied to chamber 52.

Inasmuch as any increase in the temperature of the fluid within cavity 52 increases the distance between portions 62 and 78 of control element 54 and thereby moves cylinder 68 downwardly, increased flow of cool fluid from chamber 70 and decreased flow of hot fluid from chamber 74 results from any increase in the fluid temperature in cavity 52. Decreased temperature within cavity 52 has the opposite effect, namely, raising cylinder 68 to cause increased flow of hot fluid from chamber 74 and decreased flow of cool fluid from chamber 70. It is thus evident that the control element 54 acts to maintain substantially constant the temperature of the fluid within cavity 52.

In addiion to the fluid mixing chamber 52, the valve of Figures 1 to 4 is provided with an additional fluid mixing chamber 84. This chamber is shown in the top view of Figure 3 and contains a fluid temperature controlling mechanism identical with that in cavity 52 and above described in connection with Figure 4.

In addition to showing how the warm and cool fluid reaches chambers 70 and 74 of cavity 52, Figure 5 shows how these fluids reach the corresponding chambers 88 and 90 of cavity 84. This fluid flow is controlled by the flow control check valves 40 and 46 previously mentioned so that fluid is supplied to cavity 84 only when sufficient pressure is available at receptacles 12 and 14 to overcome the pressure in the chambers 42 and 50.

Control of the temperature of the regulated fluid within cavities 52 and 84, together with drain of any fluid contained within these cavities, is achieved by drain plugs 86. These plugs are in threaded engagement with a downwardly extending threaded portion of lower closure member 22 and may be removed to provide access to cavities 52 and 84 without removing the temperature controlling elements located therein. If it is desired to alter the temperature of the regulated fluid within these cavities, these plugs may be removed and the threaded extending portions 78 of control elements 54 rotated to alter the position of control element 68 at any particular temperature of element 54. Inasmuch as this alters the relative proportion of cool and warm fluids supplied to the chamber 52 at any particular temperature, corresponding variation in the controlled fluid temperature is achieved.

Choice of the fluid from chambers 52 and 84 is achieved by the use of separate fluid control valves connecting these chambers for fluid communication with a common outlet chamber. The common chamber to which the cavities are connected is indicated at 92, Figures 3 and 4. It will be evident that this chamber is defined by the upwardly facing seat portions 94 and 96, Figure 3, of the pipe-like cast member 97 in the upper portion of cavities 84 and 52 respectively. Thus the openings of cavities 52 and 84 to the end of body 10 are annular in shape and may be closed off by an appropriate annular diaphragm 102. From Figure 4 it will be evident that the common outlet chamber 92 is connected for fluid communication with the hollow interior 98 of outlet member 24.

In order to control the magnitude of the fluid flow through portion 98 of outlet member 24, a resilient annulus type flow control valve 100 is employed. This valve is of a type well known in the art and, by reason of its flexure in correspondence with the pressure difference between chambers 92 and 98, alters the net area available for passage of fluid therebetween. Inasmuch as this area varies in accordance with the pressure in such fashion as to maintain constant the fluid flow between these chambers, the resilient annulus 100 acts as a flow governing valve to maintain substantially constant the fluid flow from the complete valve even though the pressure difference between chambers 92 and 98 varies.

The mechanism for controlling the passage of fluid from cavities 52 and 84 to chamber 92 is identical in the case of each cavity and may be understood by reference to Figure 4. As shown in this figure, a diaphragm type valve 102 of flexible material is attached to body 10 at its upper surface and extends over the seat 96. A small opening 104 is provided in the diaphragm 102 so that when plunger 106 covers the small central opening 108 therein, the pressure within upper chamber 110 is equal to the pressure within chamber 52. Inasmuch as the surface area exposed to the fluid pressure at the top side of diaphragm 102 exceeds the surface area exposed thereto in the under side thereof, diaphragm 102 is pressed downwardly and no fluid flow takes place from cavity 52 to chamber 92.

However, if plunger 106 is raised so as to permit fluid flow through passage 108, fluid flows from chamber 110 to chamber 92 and, by reason of the restricted area of passage 104, the pressure in chamber 110 approaches that of the pressure on the under surface of diaphragm 102 and causes motion thereof in the upward direction, thereby permitting fluid flow from cavity 52 to chamber 92 across the seat 96. When plunger 106 is subsequently permitted to cover passage 108 and thereby prevent fluid flow therethrough, fluid flows through restricted passage 104 to chamber 110 and eventually builds up pressure therein corresponding to the fluid pressure within cavity 52. This removes the upward force on member 102 associated with the pressure difference between chambers 110 and 52 due to fluid flow through passage 104 and permits the valve again to close. It is thus evident that fluid flow through chamber 92 is controlled by the position of plunger 106.

Plunger 106 is contained within fluid tight extension 20 of upper closure member 16 so that movement thereof does not cause fluid leakage from the valve. Motion of this plunger is achieved by current flow in solenoid 112, plunger 106 being constructed of magnetic material so as to respond to the magnetic field due to current flow within this solenoid. A similar solenoid (not shown) is provided for the upwardly extending portion 18 of upper closure 16 so as to control the flow of fluid from chamber 84 to chamber 92.

The fluid control valve described above with reference to Figures 1 through 5 is of the double type wherein two separate thermostatic fluid mixing chambers are provided so as to provide two sources of fluid having two predetermined temperatures. If fluid is desired from the valve having one of these temperatures, the corresponding shut-off valve is actuated to permit passage of fluid therefrom to outlet passage 92. On the other hand, if fluid of intermediate temperature is desired, both fluid outlet valves may be opened and a second mixing operation permitted to take place in chamber 92. Thus fluids of three predetermined temperatures may be derived from the fluid mixing valve, namely, fluid having the temperature corresponding to the setting of the control element in cavity 52, fluid of temperature corresponding to the setting of the control element in cavity 84, and fluid having temperature corresponding to that of cavity 84 as modified by fluid flow from cavity 52.

It will be evident to those skilled in the art that the shape of the body 10 is such as to facilitate casting despite the relatively complicated fluid flow passages required. This is achieved by spacing receptacles 12 and 14 in accordance with the spacing of annular inlet chambers 70 and 74, Figure 4. Since the cold fluid inlet receptacle 12, the cold fluid inlet chamber 70 for cavity 52 and the cold fluid inlet chamber 88 for cavity 84 are all located in a common plane, and warm fluid inlet receptacle 14, warm fluid inlet chamber 74 for cavity 52 and the warm fluid inlet chamber 90 for cavity 84 are located on a second common but parallel plane, it is unnecessary to provide for fluid flow in the direction transverse to these planes. By thus reducing the directions in which fluid flow must be provided, the cores necessary to form the cast passages are simplified and the cost of producing the complete valve reduced accordingly.

An alternative construction of the fluid mixing valve operation as a so-called "single" type fluid mixing valve is shown in Figures 6, 7, 8 and 9. This valve differs from the so-called double type in that only a single temperature controlled fluid mixing system is provided and a choice of three temperatures of the outlet fluids is achieved by shunting a portion of one fluid stream about the valve. In the valve of Figures 6 through 9 the body portion is indicated at 120 and may comprise a casting of bronze or similar material. An upper closure element 16 identical with that above described with reference to the valve of Figures 1 through 5 is attached to the upper portion of body 120. Similarly, a lower closure element 122 is attached by screws 124 to the lower portions of body 120. This lower closure element differs from the lower closure 22 of the valve of Figures 1 through 5 only in that it is made shorter because of the fact that only a single temperature control system is provided in the valve of Figures 6 through 9. Fluid outlet member 24a, Figures 6 through 9, corresponds to fluid outlet member 24, Figures 1 through 4.

Figure 7 shows a cross-sectional view through the axis VII—VII, Figure 6, but with the thermostatic control element removed. As shown in this figure, a fluid mixing chamber 126 is provided in body 120 and has annular fluid inlet chambers 128 and 130 corresponding to chambers 74 and 70, respectively, Figure 4. Chamber 130 is in direct connection to the cool fluid inlet receptacle 132 whereas warm fluid is supplied to chamber 128 through opening 134.

The method by which warm fluid is supplied to chamber 128, Figure 7, is shown in Figure 8 which is a cross-sectional view through axis VIII—VIII, Figure 6. As shown in this figure, warm fluid receptacle 136 is provided with the fluid check valve shown generally at 138, the opposite side of this valve opening into passage 134. This valve prevents the passage of fluid to chamber 134 unless the fluid pressure difference between inlet receptacle 136 and passage 134 is sufficient to overcome the bias of the check valve spring.

The view of Figure 8 further shows how warm fluid receptacle 136 is in fluid communication with chamber 140 which supplies warm fluid for direct passage into the outlet chamber 142, the common outlet for both portions of the valve of Figure 6. A fluid operated control valve shown generally at 144 is provided to control the flow of fluid between chambers 140 and 142, this valve being shown in the open position in Figure 8. It will, of course, be understood that a similar check valve is provided directly above cavity 123 to control the flow of fluid therefrom to chamber 142.

Figure 9 shows a top view of the valve of Figure 6 with the top closure member 16 removed and indicates clearly how chambers 140 and 126 open upwardly in a common direction with chamber 142 and may be provided with shut-off valves of the type described above with reference to Figure 4.

In the fluid control valve of Figures 6 through 9 opening the flow control valve between chamber 126 and chamber 142 will cause passage of fluid to outlet member 24a having temperature corresponding with the fluid in chamber 126, whereas opening the flow control valve connecting chamber 140 with chamber 142 will cause fluid in the outlet member 24 to correspond in temperature with the fluid temperature within cavity 140. On the other hand, if both fluid valves are open, the fluid flow in member 24a will be of temperature corresponding to that in cavity 126 as modified with the temperature of fluid in cavity 140. The fluid temperature in cavity 126 is maintained constant by the operation of the thermostatic control elements located therein (not shown), whereas the fluid temperature within cavity 140 is the temperature of the hot fluid supply connected to receptacle 136. The three available fluid temperatures are accordingly the regulated temperature, the hot fluid temperature, and an intermediate temperature.

One of the features of my invention resides in limiting the maximum forces that may be applied to the body structure of the fluid mixing valve. This limitation results from the use of spring 60, Figure 4, to hold the temperature control element 54 in place. This spring has a much greater spring constant than spring 80 and as a consequence of that fact is not flexed to any appreciable degree until cylinder 68 engages the lower closure element 22. At this point, however, further increases in the temperature within cavity 52 cause further expansion of element 54 which, if unrestrained, would be exerted against the body 10 and might cause rupture thereof. In the structure of my invention, however, spring 60 merely deflects and permits element 54 to expand without exerting excessive force on the body 10. It is thus impossible for rupture or damage to take place by reason of an excessively high fluid temperature within cavity 52.

While I have shown particular embodiments of my invention, it will, of course, be understood that I do not wish to be limited thereto since many modifications both in the elements employed and their cooperative structures may be made without departing from the spirit and scope thereof. I, of course, contemplate by the appended claims to cover any such modifications as fall within the true spirit and scope of my invention.

I claim as my invention:

1. A valve for mixing fluids from a pair of sources, comprising a body with a pair of inner side walls defining cavities extending therethrough, each of said cavities having a pair of chambers spaced relative to the length thereof and in fluid communication with said sources and a region of reduced size more remote from one side of said body than said chambers; a temperature sensitive device in each of said cavities and varying in length between two spaced points upon variation in temperature, opposed yieldable supports for each of said devices, one of said supports having relatively great resistance to yielding and acting against the wall formed by said region of reduced size, a shiftable valve element threadedly connected to each of said devices at the other of said points so as to maintain substantially constant fluid temperature in each of said cavities, a closure for said one side of said body, said other of said supports for said devices having relatively slight resistance to yielding and being disposed to act against said closure so that said closure retains said devices and said valve elements in each of said cavities, said closure having removable elements to permit adjustment of said shiftable elements relative to said devices, means defining an outlet passage, said body including portions facing the other side of and symmetrically disposed within the openings formed by said cavities, said portions having auxiliary openings in fluid communication with said outlet passage, a closure in spaced relation to said other side of said body and in fluid-tight engagement therewith about the edges of said cavities to define fluid chambers, and means at will to close said auxiliary openings to control the passage of fluid in said outlet passage.

2. A fluid mixing valve of the type wherein fluids from separate sources are mixed to obtain a resultant fluid stream, said valve comprising a body member having inner side walls defining two fluid mixing cavities, each having an axis and extending to one side of said body, a temperature sensitive device in each of said cavities, said body member having two openings spaced along said axes, each of said openings being in communication with each cavity to admit fluid thereto, a fluid inlet for each of said openings, said cavities each having a region of decreased size more remote from said one side of said body than said openings, an outlet for each cavity directing fluid to engulf each of said temperature sensitive devices and leading from the part most remote from the open side of said body to a common discharge passageway, shunt passages bypassing each of said cavities running from each of said fluid inlets to said outlet, valve means for controlling fluid flow through said shunt passages and axially shiftable elements acting against the wall formed by said regions of decreased size to control admission of fluid from said openings.

3. A fluid mixing valve adapted to mix hot and cold liquid and deliver liquid at a relatively constant temperature comprising a valve body having an inner side wall defining a cylindrical cavity opening to one side of said body, a temperature sensitive device mounted in said cavity and including a casing having a plunger extensible therefrom upon variations in temperature therein, two supports, one surrounding the casing of said temperature sensitive device and having said casing slidably mounted therein and the other being secured to the casing of said temperature sensitive device, and opposed load limiting spring means acting against said temperature sensitive device in opposite directions and retaining said temperature sensitive device within said cavity, one of said spring means urging said temperature sensitive device into a retracted position and also holding said temperature sensitive device within said cavity and the other of said spring means being interposed between said supports and yieldably holding said temperature sensitive device in engagement with said one support member and yielding upon overtravel of said temperature sensitive device, and a valve element operatively connected to said plunger and moved thereby along said cavity upon movement thereof and controlling the flow of hot and cold liquid to said cavity.

4. A mixing valve adapted to mix incoming hot and cold water and to deliver water at a predetermined constant temperature, a valve body having inner side walls defining two cavities extending therethrough, hot and cold liquid inlets into each of said cavities through the side walls thereof at points spaced therealong, a temperature sensitive device mounted in each of said cavities in the path of flow of the mixed water therein when flowing from said cavities for discharge, said devices including casings having plungers movable with respect thereto in accordance with changes in temperature of the water within said cavities, two spaced annular supports for said temperature sensitive devices within each of said cavities, one having said casing slidably mounted therein, and the other being secured to said casing, yieldable members interposed between said annular supports to yield upon overtravel thereof, closure means for closing one side of said body and one end of said cavities, and yieldable means interposed between said closure means and said plungers and maintaining said temperature sensitive devices and annular supports in position within said cavities and also urging said plungers into retracted positions, valve means operatively connected with said temperature sensitive devices and controlling the flow of water into said cavities through said inlets by the temperature within said cavities, means extending within said cavities and defining a common outlet therefrom, and valve means selectively operable to control the flow of water from said cavities through said common outlet.

LESLIE A. KEMPTON.

REFERENCES CITED

The following references are of record in the file of this patent:

UNITED STATES PATENTS

| Number | Name | Date |
|---|---|---|
| Re. 19,488 | Russell | Mar. 5, 1935 |
| 1,024,729 | Lawler | Apr. 30, 1912 |
| 1,076,293 | Lawler | Oct. 21, 1913 |
| 1,611,650 | Lawler | Dec. 21, 1926 |
| 1,641,561 | Whidden | Sept. 6, 1927 |
| 1,752,116 | Smith | Mar. 25, 1930 |
| 1,942,270 | Resek | Jan. 2, 1934 |
| 2,093,218 | Thieulin | Sept. 14, 1937 |
| 2,199,129 | Hamilton | Apr. 30, 1940 |
| 2,235,651 | Slezak | Mar. 18, 1941 |
| 2,317,717 | Bauman | Apr. 27, 1943 |
| 2,326,096 | Dillman | Aug. 3, 1943 |
| 2,425,788 | Edwards | Aug. 19, 1947 |

FOREIGN PATENTS

| Number | Country | Date |
|---|---|---|
| 792,774 | France | Oct. 28, 1935 |

OTHER REFERENCES

Sarco, Catalog sheet, A. I. A., file 29–D21, Sarco No. 140, published June 1936 by Sarco Company, Incorporated, 188 Madison Avenue, New York (two pages).